United States Patent

[11] 3,599,624

| [72] | Inventor | Emil Gehring |
| | | 114 S. Second Ave., Wausau, Wis. 54401 |
| [21] | Appl. No. | 839,987 |
| [22] | Filed | July 8, 1969 |
| [45] | Patented | Aug. 17, 1971 |

[54] ROTATABLE BARBECUE GRILL
3 Claims, 4 Drawing Figs.

[52] U.S. Cl. .................................................. 126/25 R
[51] Int. Cl. .................................................. A47j 37/00, F24b 3/00
[50] Field of Search .......................................... 126/9, 25, 25 A; 99/402, 421

[56] References Cited
UNITED STATES PATENTS

| 206,422 | 7/1878 | Collier | 126/9 |
| 870,894 | 11/1907 | MacDougall | 99/402 |
| 2,058,172 | 10/1936 | Myers | 126/25 |
| 2,297,825 | 10/1942 | Bobo | 99/402 X |
| 2,826,981 | 3/1958 | Chick | 99/402 X |
| 2,975,698 | 3/1961 | Miller | 99/402 X |

*Primary Examiner*—Charles J. Myhre
*Attorney*—Donald A. Rowe

ABSTRACT: The invention described herein is a highly functional, portable barbecue grill having a grill mounted on a fire box in such a manner to be easily rotatable to readily expose the opposite sides of the grill to the barbecue fire. The invention described and illustrated herein is comprised of a base member having supporting legs extending therefrom, collapsible plates to set on the base member and function as the sidewalls of the fire box of the barbecue, and a grill mounted in receiving slots extending from the sidewalls.

PATENTED AUG 17 1971 3,599,624

INVENTOR
EMIL GEHRING

BY Donald A. Lowe

ATTORNEY 3,599,624

ROTATABLE BARBECUE GRILL

FIELD OF INVENTION

This invention relates to a portable barbecue grill having a unique mounting arrangement between the fire box and the grill basket permitting a manual rotation of the grill basket in a vertical plane. The unique mounting arrangement permits the opposite sides of the food in the grill basket to be exposed to the barbecue fire within the fire box by a simple rotation or flipping of the grill basket about its mounting means.

DISCUSSION OF PRIOR ART

The prior art of barbecue grills consists of a multitude of horizontal and vertically mounted grills that feature several arrangements for rotating the food about the barbecue fire. The patents to Roberts et al. 03,363,543 Smith 03,188,939 and Schultz 03,389,651 are representative of the prior arc of barbecue grills. The barbecue grills that are the subjects of the aforesaid patents are relatively sophisticated devices requiring a motorized drive to rotate their grill baskets. These barbecue grills do not have the degree of portability of the instant invention.

SUMMARY OF INVENTION

The instant invention is a departure from the trend of barbecue grills to become more and more sophisticated in presenting a grill that is simple in concept, extremely functional to the user portable for transportation and adaptable to mass production. The instant invention presents a barbecue grill that is so mounted on a fire box that the user may easily rotate the grill basket so that the food being cooked is exposed evenly on both sides to the heat of the fire.

The grill basket is of two piece wire construction to form a basket therebetween to hold food. The grill basket is adjustable to different food capacities by varying the spacing between the two wire members. The food can be cooked to a desired degree and then easily rotated to cook its other side. The instant barbecue grill is extremely maneuverable to permit frequent turning and thorough cooking of the food. The grill basket, fire box and support platform are all collapsible into a compact portable unit.

BRIEF DESCRIPTION OF THE DRAWINGS

Referring now to the drawings.

DESCRIPTION OF A PREFERRED EMBODIMENT

Figure 1:
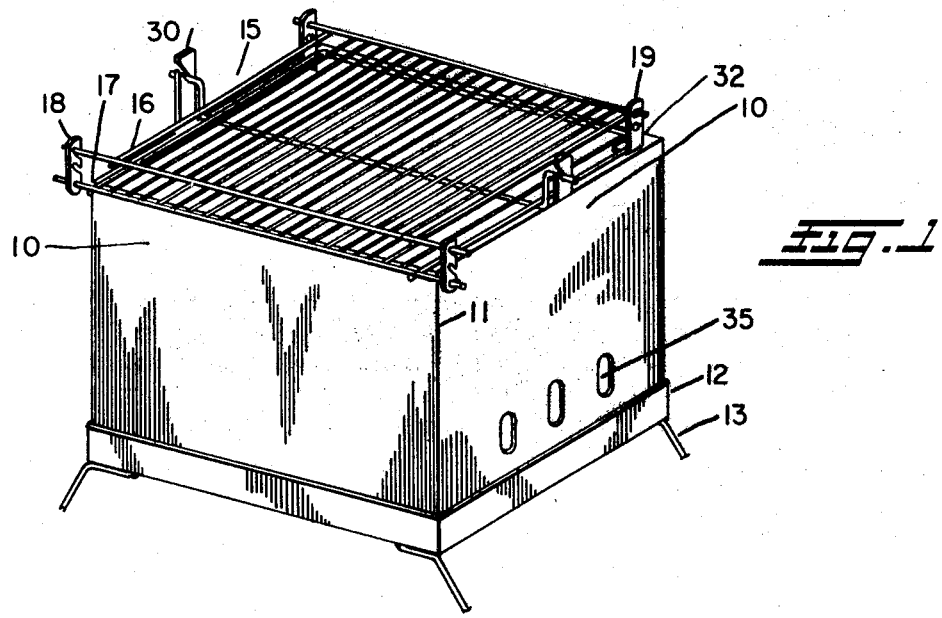
FIG. 1 is an isometric of a preferred embodiment of the invention illustrating the fire box, the grill basket and the means of mounting the grill basket on the fire box.

Referring now more particularly to the drawings, a typical illustration of a barbecue grill utilizing the instant invention is shown in FIG. 1. The fire box is comprised of sidewall members which can be individual members or can be two or more members interconnected by hinge means at their corner juncture. In a preferred embodiment, hinge means 11 interconnects two side piece metal plates 10; opposite to the side plate members 10 illustrated in FIG. 1 would be similar side plate members which would be interconnected to the side plate members 10 by means of or an extension from one of the side plate members received in press fitting relationship into a receiving groove of an adjacent side plate member.

The side plate members 10 are formed to be press fittingly received in the base platform member 12 which usually is of a unitary piece construction. The base platform member 12 in a preferred embodiment is supported from the ground or floor surface by means of legs 13 which are collapsible to fit close to the underside of the base platform 12. As is obvious, the side plates members 10 and the base platform member 12, with its supporting legs 13, are capable of being folded into a very compact unit which can be housed in a relatively small box for transportation by the user.

Figure 2:
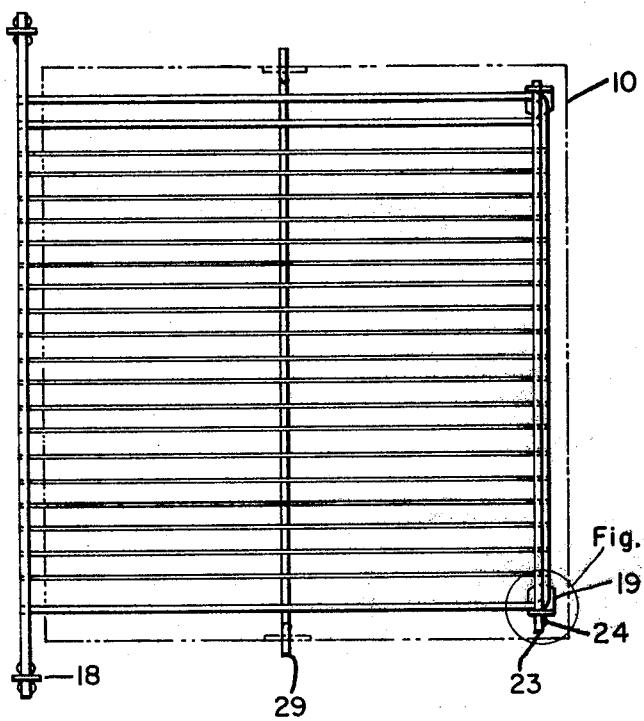
FIG. 2 is a plan view of the grill basket.
Figure 4:
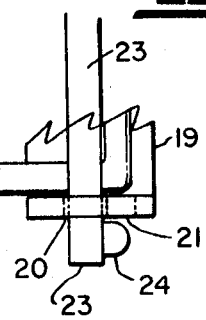
Figure 3:
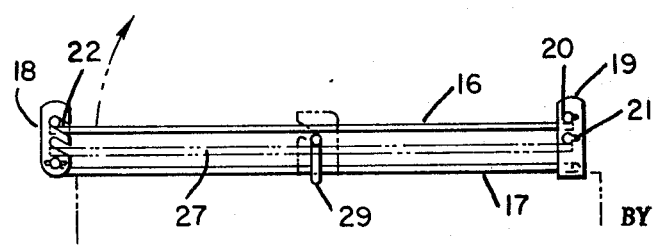
FIG. 3 is an elevation view of the grill basket showing the different settings of capacity of the grill basket that are available to the user.

The grill basket member generally referred to as 15 in FIG. 1 is comprised of two panel members 16 and 17, respectively, of wire construction. The material comprising the grill basket 15 and the side plate members 10, as well as the base platform member 12 must be a heat resistant material to withstand the heat of the barbecue fire given off by the burning of the fuel supported by the base platform 12. The opposing panel members 16 and 17 of the grill basket are interconnected by means of snap ring members 18 at one end and adjustable hinge means 19 at the other end. As can be seen in FIG. 3, the releasable snap ring members 18 have inclined slots 22 therein to receive an end bar member of the panel member 16. The inclined slot configuration can also be clearly seen in FIG. 1. The end bar member of the panel member 16 is press fitted into the slots 22; only two slots 22 are illustrated in FIG. 3, but it is obvious to one skilled in the art that the number of inclined slot settings could be indefinite. The adjustable hinge member 19 as illustrated in FIG. 3 has bearing holes 20 and groove means 21 therein. The corresponding end bar member of panel number 16 has wire member extension 23 to fit into and be received by the bearing holes 20 as well as a nub boss or protrusion 24 (see FIG. 2) extending from the wire bar extension 23 of the same shape and size as the groove means 21. Wire bar extension 23 has only one nub (boss) 24 on the same side of each of its ends and members 19 each have identical bearing holes 20 and single continuous groove means 21 for receiving said wire bar extension and nub (boss) 24. Accordingly, the wire bar extension 23 and its nub boss 24 when arranged in the proper position can be slid within the bearing hole 20 and groove 21 of each of the members 19, respectively, one at a time to permit the panel member 16 to be adjusted to different heights in the member 19 corresponding to the different bearing hole settings in member 19. The details of the groove and boss arrangement of end members 19 and wire 23 can be clearly seen in FIG. 4. As is obvious to one skilled in the art, the bearing member 19 could have several different settings of different bearing holes to permit different settings of the panel member 16 in relation to panel member 17. FIG. 3 shows in phantom a second setting 27 of panel member 16 which is shown in a first setting 16 as illustrated by the solid lines in FIG. 3.

One of the panel member 16 or 17 will carry a reinforcing wire bar member 29 which will also serve as the mounting wire means to be received in the supports 30 extending from the fire box side panel members 10. The supports 30 have inclined notches therein to receive the wire member 29 in snug relationship but with sufficient clearance to permit rotation of the bar member 29 within the inclined slot. The notch supports 30 are mounted off center on the side panel members 10 so that when the panel members 16 and 17 are mounted on the fire box, then one end of the grill basket 15 will extend out of the fire box and the other end will be inside of the opposite end of the fire box as illustrated in FIG. 1. For obvious reasons, this scheme of mounting the grill basket is desirable to permit limited rotation of the grill basket about the supports 30. As can be readily seen, the grill basket can be easily rotated about the supports 30 by the user applying a finger to the releasable snap rings 18 as illustrated in FIG. 1 and rotating the grill basket about the supports 30 clockwise until the edge of the grill basket of panel member 16 engages the opposite edge of the fire box indicated as 32 in FIG. 1. In this manner, the food within the grill basket 15 can be easily turned to permit even exposure of the opposite sides of the food to the fire within the fire box 10 so that the food retains its natural juices and is cooked evenly throughout. The inventor has found that the instant invention permits the barbecuing of meat to a desired cooking without burning. The instant invention is adaptable for use with any kind of meat, fish or fowl and also vegetables.

The fire box 10 usually is provided with air vents 35. As is obvious to one skilled in the art, the fire box 10 could be of different heights in relation to the platform base 12 to permit the grill basket 15 to be mounted at different heights in relation to the fire within the fire box.

The instant invention is adaptable to an extremely portable unit as described hereinabove. The fire box and the grill basket can be made of relatively light weight materials. Charcoal is the ordinary fuel utilized in connection with the invention to be burned within the fire box.

While I have shown and described the preferred embodiment of the invention, it will be understood that the embodiment is merely for the purpose of illustration and description only and that various other forms may be devised and that changes may be made in the proportion and minor details of construction without departing from the spirit of the invention and the scope of the appended claims.

What I claim is:

1. A barbecue grill and fire box comprised of:
    a fire box for holding fuel having notched supports located offcenter and extending from and slightly above two opposite sides of the fire box; and
    a grill basket for holding food having two panels of open wire construction interconnected and held in fixed spaced relationship to each other by fixed members at one end and releasable members at the other end; and
    a wire member extending transverse of the grill basket and parallel the end members, having its ends extended to be mountingly received by the notched supports of the opposite sides of the fire box;
    the grill basket mounted offcenter of the fire box about the notched supports with one end of the grill basket extending beyond and the other end within the perimeter of the fire box permitting the grill basket to be manually rotatable one hundred eighty degrees from side to side in a vertical plane about the notched supports of the fire box until said one end of the grill basket engages the fire box.

2. The barbecue grill and fire box described in claim 1 wherein the grill basket is adjustable to different capacities by means of (i) inclined notches in the releasable members for receiving a first transverse end wire member of one of said panels in press fitting relationship, and (ii) bearing holes and grooves arranged in said fixed members to receive a second transverse end wire member and bosses thereon at opposite ends of said panels.

3. The barbecue grill and fire box described in claim 2 wherein the second transverse end wire member and integral bosses of the grill basket can be slid transversely within the receiving bearing holes and grooves of the fixed members when the wire member and bosses are aligned with the holes and grooves permitting adjustment of the grill basket by removal of the wire member from one hold and groove and relocation to a second hole and groove of the fixed members.